US009921857B1

(12) United States Patent
Kaplan et al.

(10) Patent No.: US 9,921,857 B1
(45) Date of Patent: Mar. 20, 2018

(54) COMPILER EXTENSION FOR CORRECTING ERROR MESSAGES

(71) Applicant: Red Hat Israel, Ltd., Raanana (IL)

(72) Inventors: Alona Kaplan, Raanana (IL); Michael Kolesnik, Raanana (IL)

(73) Assignee: Red Hat Israel, Ltd., Raanana (IL)

( * ) Notice: Subject to any disclaimer, the term of this patent is extended or adjusted under 35 U.S.C. 154(b) by 0 days.

(21) Appl. No.: 15/425,590

(22) Filed: Feb. 6, 2017

(51) Int. Cl.
*G06F 9/45* (2006.01)
*G06F 9/445* (2018.01)

(52) U.S. Cl.
CPC .......... *G06F 9/44526* (2013.01); *G06F 8/41* (2013.01); *G06F 8/42* (2013.01); *G06F 8/43* (2013.01)

(58) Field of Classification Search
CPC ........................................................ G06F 9/45
USPC ................................................ 717/140–151
See application file for complete search history.

(56) References Cited

U.S. PATENT DOCUMENTS

| | | | | |
|---|---|---|---|---|
| 5,412,756 A * | 5/1995 | Bauman | .................. | G06N 5/043 706/45 |
| 5,565,316 A * | 10/1996 | Kershaw | .................. | G09B 7/02 434/118 |
| 5,673,390 A | 9/1997 | Mueller | | |
| 6,275,986 B1 | 8/2001 | Ewart | | |
| 6,339,777 B1 * | 1/2002 | Attaluri | ............. | G06F 17/30595 |
| 6,585,777 B1 * | 7/2003 | Ramaley | ........... | G06F 17/30076 707/999.1 |
| 6,801,659 B1 * | 10/2004 | O'Dell | .................. | G06F 3/0237 382/185 |
| 6,886,115 B2 * | 4/2005 | Kondoh | ................ | G06F 17/272 714/52 |
| 7,076,772 B2 | 7/2006 | Zatloukal | | |
| 7,634,763 B2 | 12/2009 | Wain et al. | | |
| 7,712,030 B1 | 5/2010 | Blau et al. | | |
| 7,810,081 B2 | 10/2010 | Dickenson et al. | | |
| 9,274,770 B2 | 3/2016 | Song et al. | | |
| 2002/0107837 A1 * | 8/2002 | Osborne | ............. | G06F 11/1471 |

(Continued)

FOREIGN PATENT DOCUMENTS

CN 101216776 7/2008

OTHER PUBLICATIONS

"Change Compiler Errors Language in Visual Studio 2013," http://stackoverflow.com/questions/22529464/change-compiler-enors-language-in-visual-studio-2013, 2 pages, Mar. 20, 2014.

(Continued)

*Primary Examiner* — Jae U Jeon
(74) *Attorney, Agent, or Firm* — Lowenstein Sandler LLP

(57) ABSTRACT

A mechanism for correcting mistakes in error messages in a set of instructions is disclosed. A processing device may receive a set of instructions for a program. The processing device may generate a first table of key-value pairs for a first set of error messages that are within the set of instructions, where keys of the key-value pairs in the first table correspond to error messages and values of the key-value pairs represent symbols to insert into the error messages. A second table of key-value pairs for default error messages may be received. A determination may be made of a mistake for a key of the keys of the key-value pairs in the first table by identifying that the key of the key-value pairs in the first table is not in the second table. A fault message may be generated to indicate the mistake with the key.

20 Claims, 7 Drawing Sheets

(56) References Cited

U.S. PATENT DOCUMENTS

| | | | |
|---|---|---|---|
| 2002/0169999 A1* | 11/2002 | Bhansali | G06F 8/44 |
| | | | 714/26 |
| 2005/0193040 A1* | 9/2005 | Adiba | G06F 17/30318 |
| 2006/0271920 A1 | 11/2006 | Abouelsaadat | |
| 2008/0022259 A1* | 1/2008 | MacKlem | G06F 8/34 |
| | | | 717/113 |
| 2008/0270438 A1* | 10/2008 | Aronson | G06F 19/322 |
| 2010/0332216 A1* | 12/2010 | Williams | G06F 17/2872 |
| | | | 704/4 |
| 2011/0249011 A1* | 10/2011 | Lalonde | G06T 1/20 |
| | | | 345/522 |
| 2013/0125101 A1 | 5/2013 | Pamer | |
| 2014/0013307 A1* | 1/2014 | Hansson | G06F 11/3692 |
| | | | 717/124 |

OTHER PUBLICATIONS

Czaplicki, "Compiler Errors for Humans," http://elm-lang.org/blog/compiler-errors-for-humans, 4 pages, Jun. 30, 2015.

* cited by examiner

| Keys 110 | Values 120 | Messages 130 |
|---|---|---|
| Failed_To_Update_Network_MTU 112 | $mtuValue, $networkName 122 | Failed to set MTU $mtuValue on network $networkName 132 |
| Undeclared_Identifier_Error | $identifierdeclaration | Failed to declare $identifierdeclaration |
| Common_Function_Undeclared_Error | $commonfunction | Failed to declare $commonfunction |
| Parsing_Error | $parsingvalue | Parsing failure at $parsingvalue |
| File_check_sequence_error | $filesequence | File out of sequence at $filesequence |
| Failure_to_define_a_network_name | $networkname | Failed to define the name of network $networkname |
| Failure_to_define_a_network_path | $networkpath | Failed to define the path of network $networkpath |
| Conflicting_internet_protocol_address_error | $IPaddress | Conflicting internet protocol address for $IPaddress |

FIG. 1

Translated Error Messages 200

| Keys 210 | Values 220 |
|---|---|
| Undeclared_Identifier_Error | $identifierdeclarati |
| Common_Function_Undeclared_Error | $commonfunction |
| Parsing_Error | $parsingvalue |
| Failure_to_define_a_network_name | $networkname |
| Failure_to_network_path | $networkpath |
| Conflicting_internet_protocol_address_error | $internetprotocoladdress |
| | |
| | |

Default Error Messages 230

| Keys 240 | Values 250 |
|---|---|
| Failed_To_Update_Network_MTU | $mtuValue |
| Undeclared_Identifier_Error | $identifierdeclaration |
| Common_Function_Undeclared_Error | $commonfunction |
| Parsing_Error | $parsingvalue |
| File_check_sequence_error | $filesequence |
| Failure_to_define_a_network_name | $networkname |
| Failure_to_define_a_network_path | $networkpath |
| Conflicting_internet_protocol_address_error | $IPaddress |

COMPILER EXTENSION FOR CORRECTING ERROR MESSAGES

TECHNICAL FIELD

Aspects of the present disclosure are generally related to computer systems, and more particularly to a compiler extension for correcting errors in a set of instructions.

BACKGROUND

Programs written in certain high-level programming languages, such as Java, may be converted to a platform-specific set of instructions. A compiler may translate a program written in the high-level programming language into a platform-specific set of instructions by generating an application using the source code of the program. The compiler may be capable of performing various optimizations when generating an application.

BRIEF DESCRIPTION OF THE DRAWINGS

The present disclosure is illustrated by way of examples, and not by way of limitation, and may be more fully understood with references to the following detailed description when considered in connection with the figures, in which:

FIG. 1 depicts a table of key-value pairs for error messages in a set of instructions according to one example.

FIG. 2 illustrates a first key value table with translated error messages for a first set of instructions and a second key value table with default error messages for a second set of instructions according to one example.

DETAILED DESCRIPTION

Figure 3:
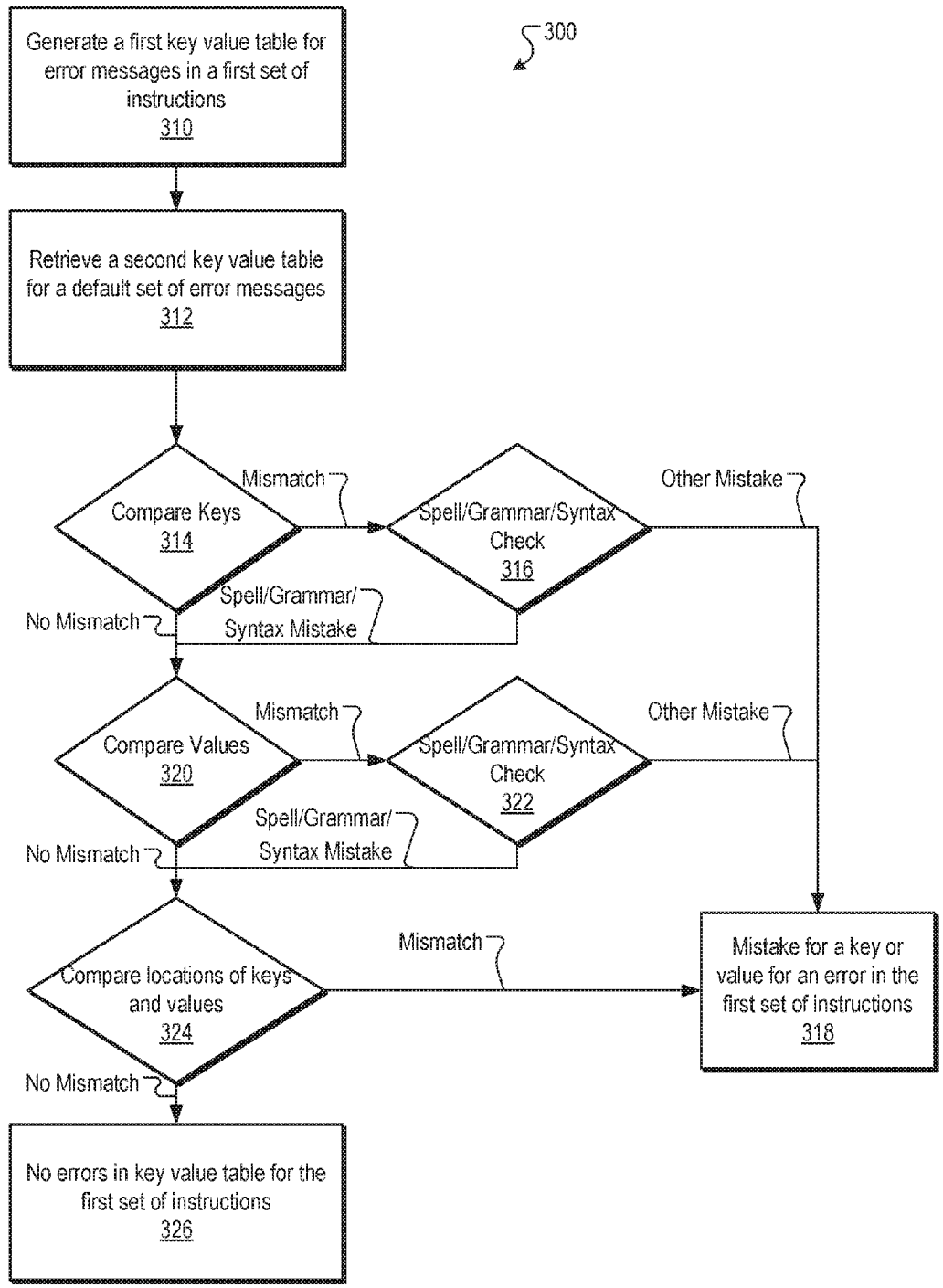
FIG. 3 illustrates a method for identifying mistakes in error messages of a key value table according to one example.

A compiler is a program that takes as input a program written in a source language and produces as output an equivalent program written in a target language. The compiler may be designed to translate any source language into any target language. For example, a program may be written as a textual representation of computer-executable instructions in a high-level language, such as BASIC, Pascal, C, C++, or C#. A file including a program in high-level language form is known as source code. The computer-executable instructions in the high-level language are then translated or compiled by a compiler into coded instructions executable by the computer.

Compilers may be designed to accept a set of instructions for a program in one source language and one target language. The source and target languages of these compilers are selected when the compiler is first written. A multi-language compiler may be designed to include frameworks which create a general environment in which to carry out a compilation of programs in various natural languages or programming languages. Such a multi-language compiler may enable programmers to adapt to programs that are written in multiple languages.

When a multi-language compiler compiles a program, the source code of a programming language is organized into one or more program units. These program units allow larger program tasks to be broken down into smaller units or groups of instructions. One of the program units is a set of error message instructions that are invoked when an error occurs as the program is executing after the program has been compiled. As different languages are used for programming an application or as the code of an application may be translated into different languages, spelling errors and missing error message instructions may occur during the translation process between the different languages. As source code may use precise syntax or grammar for the error message instructions, spelling errors, syntax errors, and missing error message instructions may cause the program to display incomplete or incorrect error messages when an error occurs while the program is executing.

Aspects of the present disclosure overcome this and other deficiencies by providing a compiler extension to identify mistakes in error messages for a set of instructions coded in a first language or translated into the first language from a program that was initially coded in a second language. The compiler extension may be a plugin or add-on to a compiler that adds additional features to the compiler. When the source code for a program written or translated into the first language is compiled, the compiler extension may generate a first table of key-value pairs for a set of error messages within the source code. The compiler extension may compare the first table of key-value pairs to a second table of key-value pairs that includes default error messages. The compiler extension may identify the mistakes in the error messages for the source code written or translated in the first language and generate a fault message indicating the mistakes. For example, a mismatch between keys or values in the first table and keys or values in the second table may indicate that the translation from a language into another language has resulted in an error with respect to the error messages.

An advantage of identifying the mistakes in the error messages at compilation prior to the execution of the program may aid the end user to understand the error messages when the program is later executed and an error occurs. Thus, the present disclosure may provide for a more accurate and reliable translation of the source code of a program from one language into another language.

FIG. 1 depicts a table 100 of key-value pairs for error messages in a set of instructions according to one example. A program may include a set of instructions. The set of instruction may include one or more error messages. In the set of instructions, to invoke an error message, an instruction includes keys 110 and values 120. The keys 110 are unique identifiers that each corresponds to an entry in the table 100 storing a message 130. The messages 130 represent error messages to be displayed when an error occurs during an execution of the program. The messages 130 may correspond to error messages that are identified when a program is being executed. Such error messages may include, but are not limited to, a failure to set a maximum transmission unit (MTU) on a network, an undeclared identifier error, a common function undeclared error, a parsing error, a file check sequence (FCS) error, a failure to define a network name, a failure to define a network path, or a conflicting internet protocol (IP) address error.

The values 120 are unique identifiers that correspond to a location of a symbol within the error message that may be replaced with another symbol. The unique identifier may be a symbol. The symbol may be an integer, letter, string, word, and so forth. For example, the set of instructions may include an error handler for a "failure to update a network MTU" error. The error handler may include an instruction with the key 112 and the value 122.

When the "failure to update a network MTU" error occurs, the instruction may invoke a function using the keys 110 and pass along values 120. For example, the pseudo code in the set of instructions to invoke the "failure to update a network MTU" error may be as follows: Failed_To_Update_Network_MTU($mtuValue, $networkName), where Failed_To_Update_Network_MTU is the key 112 and $mtuValue and $networkName are the values 122. When the instruction invokes the "failure to update a network MTU" error, the instruction may pass along the keys 110 and values 120 to an error handler invoked by the application to handle the "failure to update a network MTU" error.

When the "failure to update a network MTU" error is invoked, the error handler may query the table 100 to identify the message 132 corresponding to the key 112. The error handler may then identify the locations in the message where the values 120 are located. The error handler may then retrieve the messages 130, replace the values 120 with values passed to the error handler when the error is invoked, and display the error message with the passed values.

The keys 110, the values 120, and the messages 130 may be defined at the time the application is generated (e.g., when the source code of the application or program is compiled). The table 100 may be generated by a compiler extension when the compiler compiles a set of instructions or a program, as discussed in greater detail below.

FIG. 2 illustrates a first key value table 200 with translated error messages for a first set of instructions and a second key value table 230 with default error messages for a second set of instructions according to one example. The first key value table 200 may include a first set of keys 210 and a first set of values 220 associated with error messages in a first set of instructions. The second key value table 230 may include a second set of keys 240 and a second set of values 250 associated with error messages in a second set of instructions. In one implementation, the keys in the first set of keys 210 or the second set of keys 240 may be designated as keys by one or more symbols or characters located before or after the keys in the first or second set of instructions, such as function call symbols, characters, or other identifiers. In another implementation the keys in the first set of keys 210 or the second set of keys 240 may be designated as keys because they include a defined set of symbols or characters, such as a function name. In another implementation, the values in the first set of values 220 or the second set of values 250 may be designated as values by one or more symbols located before or after the values in the first or second set of instructions, respectively.

The first set of instructions may be for a program that is in a first language and the second set of instructions may be for the same program that is in a second language. In one example, the first set of instructions in the first language may be a translation of the second set of instruction in a default or original language. The first key value table 200 may include the first set of keys 210 and the first set of values 220 for error messages from the translated first set of instructions and the second key value table 230 may include may include the second set of keys 240 and the second set of values 250 for error messages from the default second set of instructions. In one implementation, the keys and values used in the first set of instructions and the second set of instructions are in the same language, while the rest of the first set of instructions is in the first language and the rest of the second set of instructions is in the second language. In another implementation, the keys and values used in the first set of instructions may be in the first language and the keys and values used in the second set of instructions may be in the second language. In one implementation, the first and second languages may be natural languages, such as English or Chinese. In another implementation, the first and second languages may be a programming language, such as BASIC, Pascal, C, C++, or C#.

When a program invokes an error handler, the error handler uses keys and values with specific spelling, syntax, and grammar. For example, if a key or a value has a spelling, syntax, or grammar mistake then the error handler may fail or not display the error message properly because the error handler may not be able to identify the appropriate message. To verify the first set of keys 210 and the first set of values 220 in the first set of instructions are correct, the compiler extension may use the method shown in FIG. 3.

FIG. 3 illustrates a method 300 for identifying mistakes in error messages of a key value table according to one example. The method 300 is performed by processing logic that may include hardware (circuitry, dedicated logic, etc.), programs (such as is run on a general-purpose computer system or a dedicated machine), or a combination of both. The method 300 may be performed in all or in part by a compiler extension executed by a processing device.

At block 310, the compiler extension may generate a key value table for error messages in a first set of instructions, such as the key value table 200 in FIG. 2. In one implementation, the compiler extension may search the first set of instructions for function calls for error messages. For example, the first set of instructions may include translation data that may be scanned by the compiler extension. The translation data may include as lines that are key value pairs, where the key is a translation message key and the value is an error message. The compiler extension may parse error messages to generate a list of the replacement keys using symbols that identify them, such as a dollar sign. The compiler extension may aggregate the function calls to generate the key value table.

In another example, the compiler extension may scan the first set of instructions using static code analysis and create a model representing the set of instructions. The compiler extension may determine where error messages are used in the first set of instructions using the model. The error messages may be sent using a class that includes an error key and a replacements dictionary which includes both a replacement key and a replacement value for each replacement. In another implementation, to generate a key value table for error messages, the compiler extension may use key value enumerations (ENUMs) that defines which possible error keys are in the first set of instructions and the compiler extension can scan the ENUMs to determine the error keys.

At block 312, the compiler extension may retrieve a second key value table for a default set of error messages, such as the key value table 230 in FIG. 2. In one example, the second key value table may have been previously generated when the program was compiled in a default or initial language. In another example, the second key value table may have been generated by user input into a graphical user interface.

At block 314, the compiler extension may compare a first set of keys in the first key value table to a second set of keys in the second key value table to identify mismatches between the first set of keys and the second set of keys. For example, referring to FIG. 2, to determine whether the keys in the first set of keys 210 match the keys in the second set of keys 240, the compiler extension may select a first key from the first set of keys 210 and query the second set of keys 240 to determine whether one of the keys of the second set of keys 210 matches the first key.

When the first key matches one of the keys of the second set of keys 240, there is no mistake for the first key during translation and the method may proceed to block 320 as discussed in greater detail below. At block 316, when the first key does not match one of the keys of the second set of keys 240, there is a mistake with the first key in the first set of instructions and the compiler extension may check for mistakes including spelling errors, grammar errors, and syntax errors for the first key. In one example, to check for different types of the mistakes the compiler extension may compare the first key against the keys in the second set of keys 240 to determine if the first key is a variant or misspelling of the second key, where the first key is a match to the second key within an error threshold.

The error threshold may be a number of symbols, characters, or values that the first key differs from one of the keys in the second set of keys. When a spelling, grammar, or syntax of the first key is within an error threshold of being the same as one of the keys in the second set of keys, the compiler extension may determine that the mistake in the first key corresponds to a spelling, grammar, or syntax mistake. For example, when the error threshold is 2 symbols (i.e., characters) so that the first key and the second key are a match except for two or fewer symbols, the compiler extension may determine that the first key and the second key are a match and that the first key has a spelling, grammar, or syntax mistake. In one implementation, when the mistake is a spelling, grammar, or syntax mistake, the compiler extension may generate a message indicating the spelling mistake and display the message via a display device. In another implementation, when the mistake is a spelling, grammar, or syntax mistake, the compiler extension may correct the spelling, grammar, or syntax of the first key to match the second key and proceed to block 320 of the method 300, as discussed in greater detail below.

At block 318, when the compiler extension determines that the mistake for the first key is not a spelling, grammar, or syntax mistake, the compiler extension may generate a message indicating the first key is not included in a default set of keys, such as the second set of keys 240. The compiler extension may display the message via a display device. The compiler extension may iteratively compare the keys in the first set of keys 210 with the keys in the second set of keys 240 to identify if any other keys in the first set of keys 240 have mistakes.

In another implementation, the compiler extension may determine a number of keys in the first set of keys 210 and a number of keys in the second set of keys 240. When the number of the number of keys in the first set of keys 210 differs from the number of keys in the second set of keys 240, the compiler extension may generate a message indicating the difference in the number of keys between the first set of keys 210 and the second set of keys 240. The compiler extension may display the message via a display device.

At blocks 320 and 322, the compiler extension may perform the same checks for the values in the first set of values 240 as performed at blocks 314 and 316 for the keys in the first set of keys 210. For example, the values in the first set of values 240 may be compared to determine if the values in the second set of values 250 match. At block 324, when there is no mismatch for the values in the first set of values 220 or a spelling, grammar, or syntax mistake has been corrected for the values in the first set of values, the compiler extension may compare the locations of the keys and values in the first set of instructions with the locations of the keys and values in the second set of instructions. For example, when the compiler extension generates the first key value table 200, the compiler extension may tag the keys and values with identifiers indicating a location (such as a line number in source code) of the keys and values in the first set of instructions. The keys and values in the second key value table 230 may also have identifiers tagged to the keys and values indicating their location in the second set of instructions. The compiler extension may compare the identifiers for the keys and values in the first key value table with the identifiers for the keys and values in the second key value table to determine whether there is a mismatch in the location of one or more of the keys or values in the first key value table.

At block 326, when there is no mismatch between the identifiers for the keys and values in the first key value table and the second key value table, the compiler extension may complete a compiling of the first set of instructions. In one implementation, the compiler extension may generate a message indicating that there are no errors for the keys and values in the first set of instructions. At block 318, when there is a mismatch between the identifiers for the keys and values in the first key value table and the second key value table, the compiler extension may generate a message indicating a mismatch in the identifiers. The message may also include a recommendation to correct the mistake. For example, the compiler extension may access a memory and retrieve a recommendation associated with the error of a mismatch of identifiers. The compiler extension sends the message to a display device for display.

Figure 4:
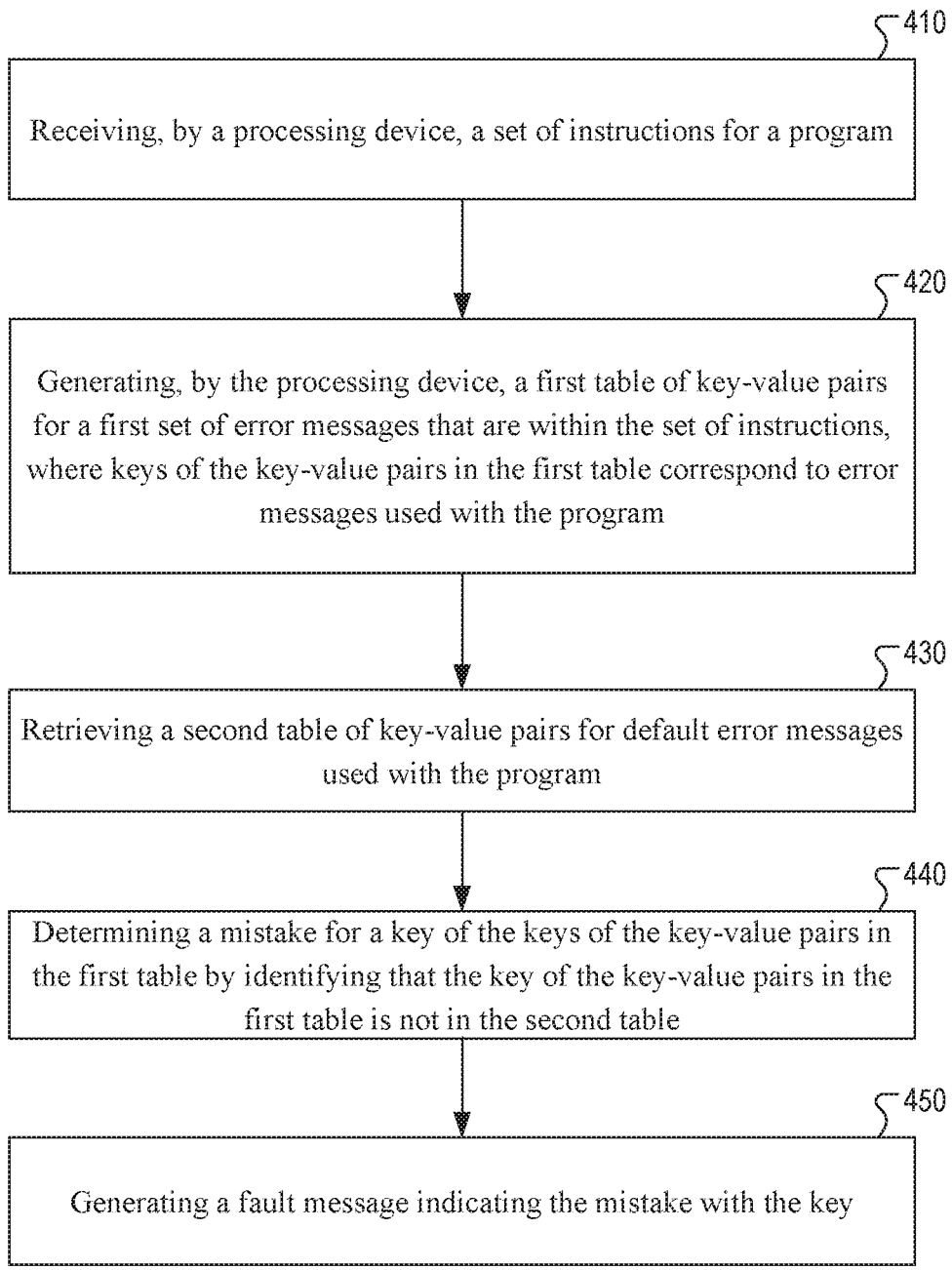
FIG. 4 depicts a flow diagram of one example of a method for generating a fault message indicating a mistake with a key.

FIG. 4 depicts a flow diagram of one example of a method 400 for generating a fault message indicating a mistake with a key. The method 400 may be performed by processing logic that may include hardware (circuitry, dedicated logic, etc.), programs (such that is run on a general-purpose computer system or a dedicated machine), or a combination of both. The method 400 may be performed in all or in part by a processor executing a compiler extension.

At block 410, a processing device receive may a set of instructions for a program. The set of instructions may be source code for the program that is a translated from a set of instructions for original source code. At block 420, the processing device may generate a first table of key-value pairs for a first set of error messages that are within the set of instructions, where keys of the key-value pairs in the first table correspond to error messages used with the program. At block 430, the processing device may retrieve a second table of key-value pairs for default error messages used with the program. At block 440, the processing device may determine a mistake for a key of the keys of the key-value pairs in the first table by identifying that the key of the key-value pairs in the first table is not in the second table. At block 450, the processing device may generate a fault message indicating the mistake with the key.

Figure 5:
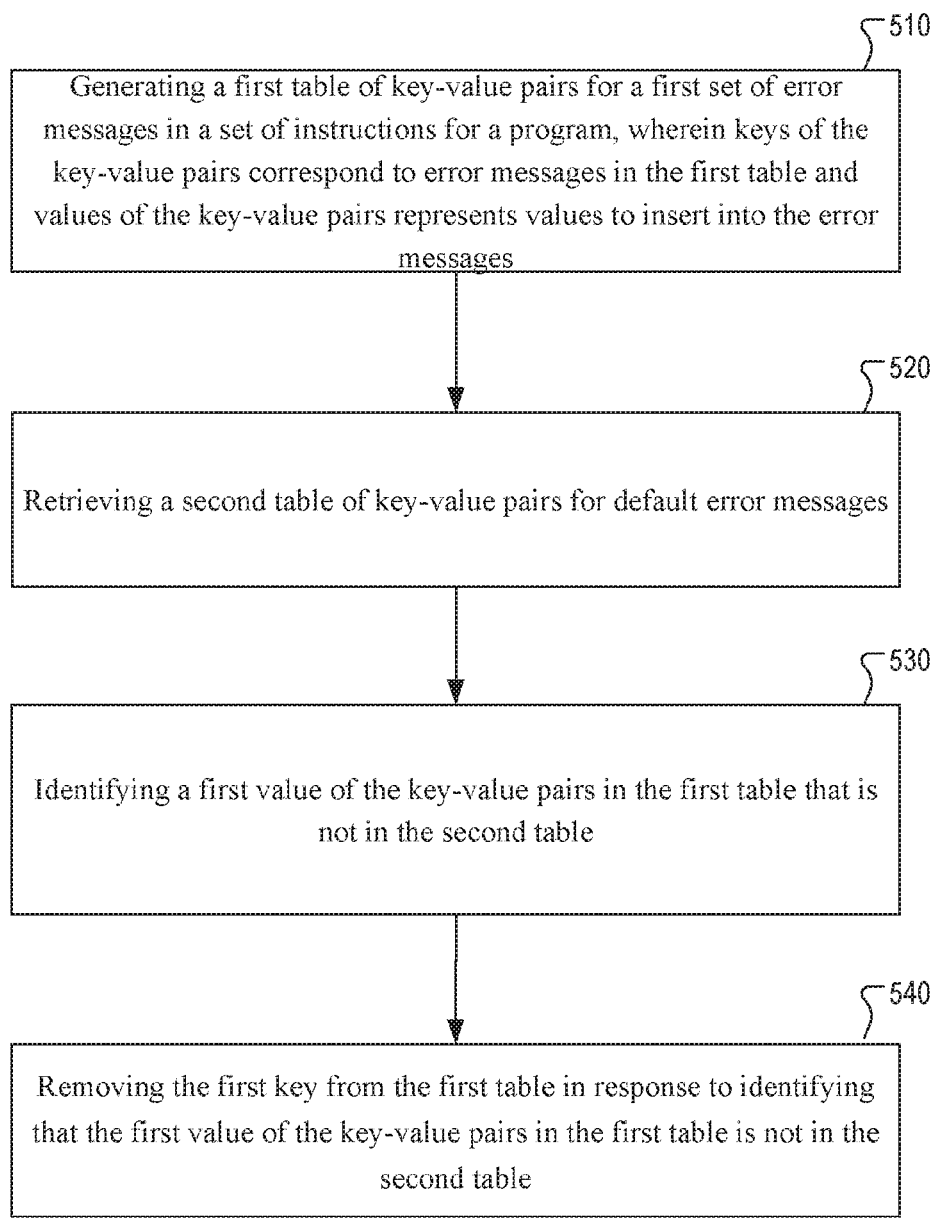
FIG. 5 depicts a flow diagram of one example of a method for removing a key from a key value table of error messages.

FIG. 5 depicts a flow diagram of one example of a method 500 for removing a key from a key value table of error messages. The method 500 may be performed by processing logic that may include hardware (circuitry, dedicated logic, etc.), programs (such that is run on a general-purpose computer system or a dedicated machine), or a combination of both. The method 500 may be performed in all or in part by a processor executing a compiler extension.

At block 510, a processing device may generate a first table of key-value pairs for a first set of error messages in a set of instructions for a program, wherein keys of the key-value pairs correspond to error messages in the first table and values of the key-value pairs represents values to insert into the error messages. The first set of error messages may be associated with a translation of source code for a program. At block 520, the processing device may retrieve a second table of key-value pairs for default error messages. At block 530, the processing device may identify a first value of the key-value pairs in the first table that is not in the second table. At block 540, the processing device may remove the first key from the first table in response to identifying that the first value of the key-value pairs in the first table is not in the second table.

Figure 6:
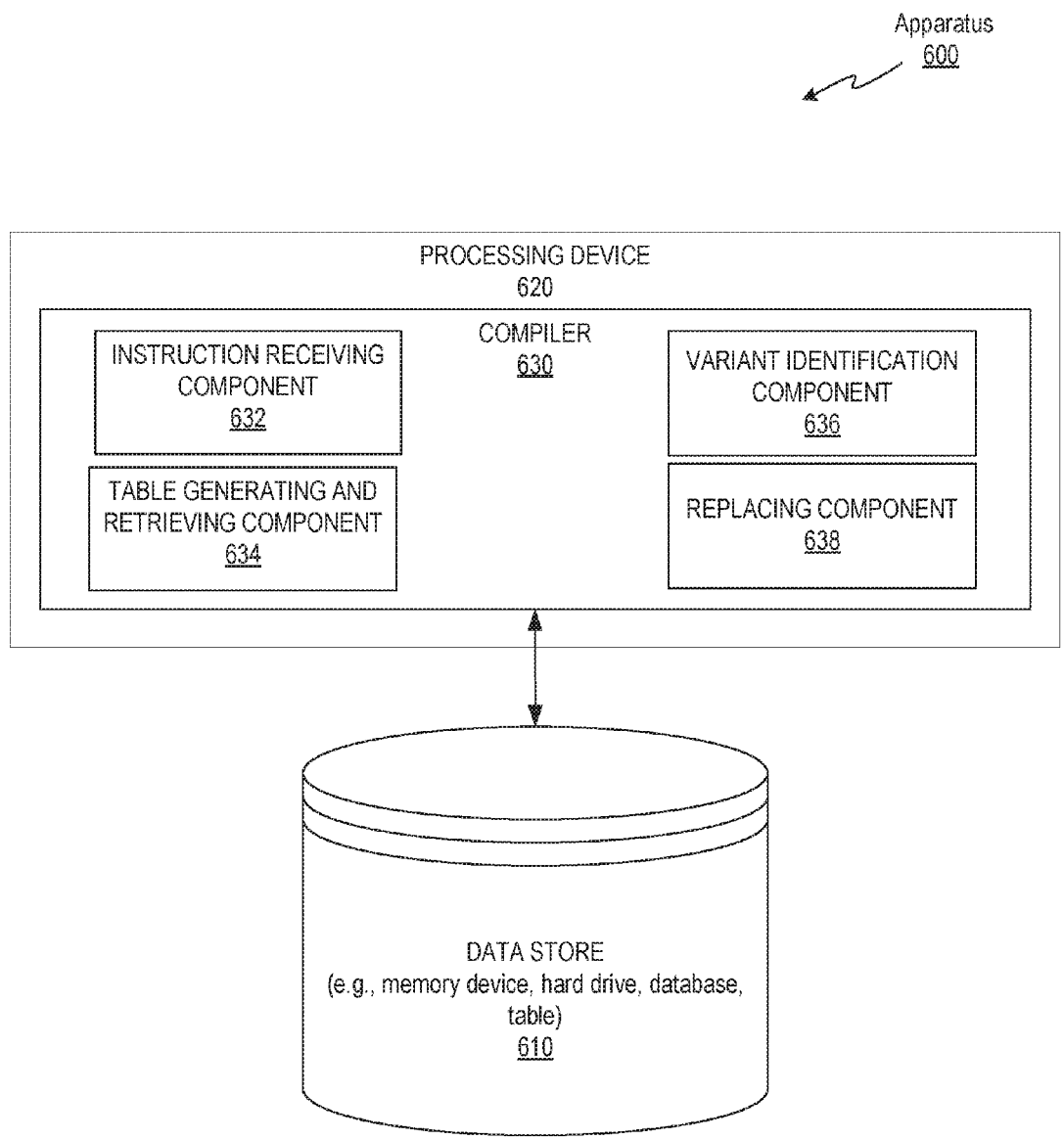
FIG. 6 illustrates an example apparatus in which implementations of the disclosure may operate.

FIG. 6 illustrates an example apparatus 600 in which implementations of the disclosure may operate. The apparatus 600 may be the same or similar to one of the distributed computer system, a network, or other computing devices. The data store 610 may include any non-persistent data storage (e.g., memory), persistent data storage (e.g., flash storage, hard drive, tape), another medium, or combination thereof that is capable of storing instructions for carrying out the operations of the components and module discussed herein. The apparatus 600 may include a data store 610 that may store key value tables (e.g., key value tables 100, 210, or 230) for a compiler extension.

The apparatus 600 may include components and modules for modifying couplings between NICs and host systems in the distributed computer system. The apparatus 600 may include a processing device 620 with a compiler extension 630. The compiler extension 630 may include an instruction receiving component 632, a table generating and retrieving component 634, a variant identification component 636, and a replacing component 638.

The instruction receiving component 632 may receive a first set of instructions where the first set of instructions is for a program in a first language. The table generating and retrieving component 634 may generate a first table of key-value pairs for a first set of error messages that are within the set of instructions, where keys of the key-value pairs correlate to error messages in the first table and values of the key-value pairs represent values to insert into the error messages.

The table generating and retrieving component 634 may also retrieve, from the memory device, a second table of key-value pairs for default error messages, where the default error messages are part of a second set of instructions for the program in a second language. The variant identification component 636 may identify a first key of the key-value pairs in first table that is not in the second table and determine that the first key is a variant of a second key in the second table. The replacing component 638 may replace the first key in the first table and in the set of instructions with the second key in the second table.

Figure 7:
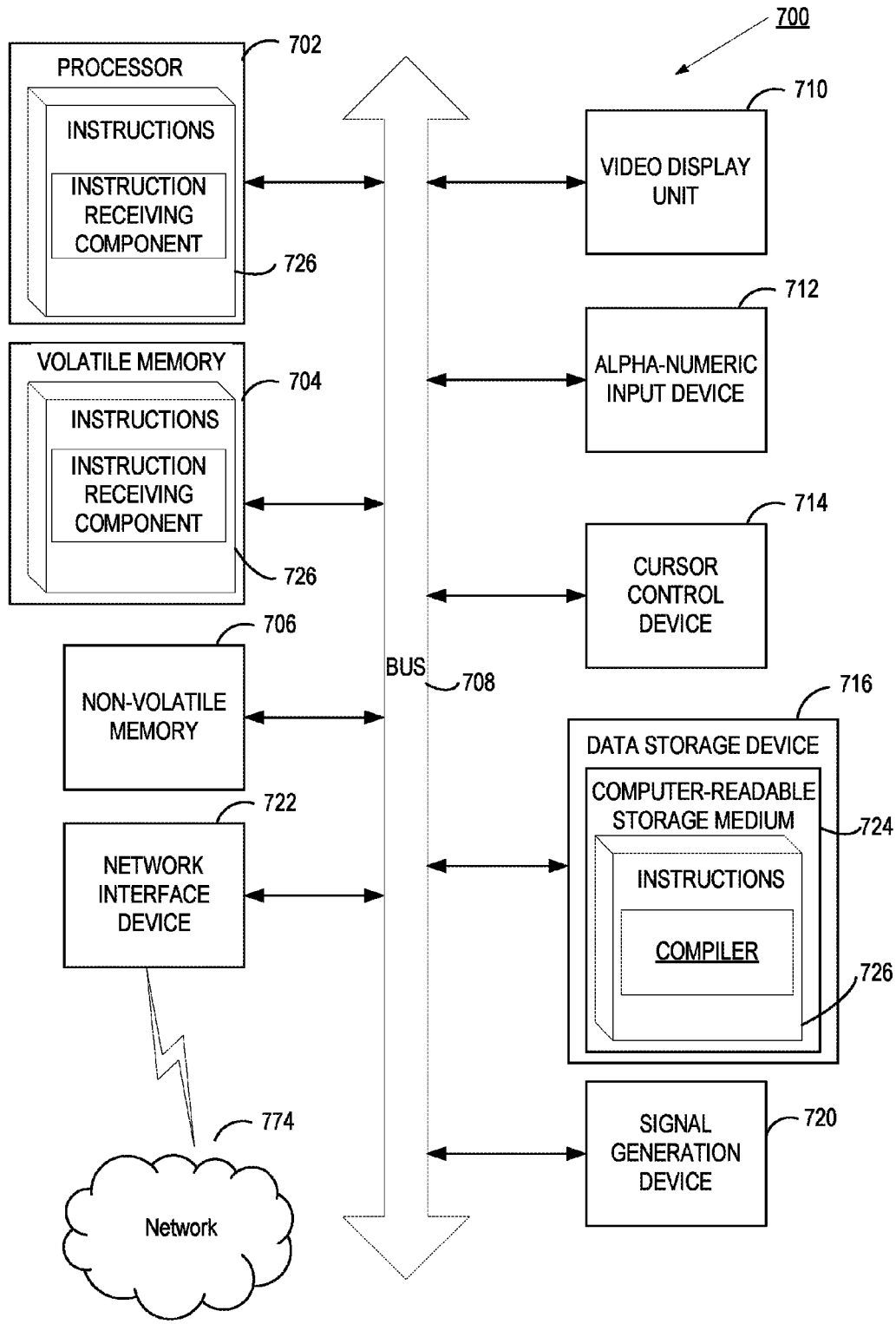
FIG. 7 depicts a block diagram of a computer system operating in accordance with one or more aspects of the present disclosure.

FIG. 7 depicts a block diagram of a computer system operating in accordance with one or more aspects of the present disclosure. In various illustrative examples, computer system 700 may correspond to one or more of a distributed computer system, the network, or other computing devices.

In certain implementations, computer system 700 may be connected (e.g., via a network, such as a Local Area Network (LAN), an intranet, an extranet, or the Internet) to other computer systems. Computer system 700 may operate in the capacity of a server or a client computer in a client-server environment, or as a peer computer in a peer-to-peer or distributed network environment. Computer system 700 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 700 may include a processor 702, a volatile memory 704 (e.g., random access memory (RAM)), a non-volatile memory 706 (e.g., read-only memory (ROM) or electrically-erasable programmable ROM (EEPROM)), and a data storage device 716, which may communicate with each other via a bus 708.

Processor 702 may be provided by one or more processing devices such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field-programmable gate array (FPGA), a digital signal processor (DSP), or a network processor).

Computer system 700 may further include a network interface device 722. Computer system 700 also may include a video display unit 710 (e.g., an LCD), an alphanumeric input device 712 (e.g., a keyboard), a cursor control device 714 (e.g., a mouse), and a signal generation device 720.

Data storage device 716 may include a non-transitory computer-readable storage medium 724 on which may store instructions 726 encoding any one or more of the methods or functions described herein, including instructions for implementing methods 300, 400, and 500.

Instructions 726 may also reside, completely or partially, within volatile memory 704 and/or within processor 702 during execution thereof by computer system 700, hence, volatile memory 704 and processor 702 may also constitute machine-readable storage media.

While computer-readable storage medium 724 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that causes the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated into the functionality of other hardware components such as ASICS, FPGAs, DSPs or similar devices. In addition, the methods, components, and features may be implemented by program modules or functional circuitry within hardware devices. Further, the methods, components, and features may be implemented in any combination of hardware devices and program components, or only in programs.

Unless specifically stated otherwise, terms such as "loading," "transmitting," "receiving," "overwriting," "initiating," "discovering," "analyzing," or the like, refer to actions and processes performed or implemented by computer systems that manipulate and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general-purpose computer system selectively programmed by a program stored in the computer system. Such a program may be stored in a computer-readable tangible storage medium.

The methods and illustrative examples described herein are not inherently related to any particular computer or other apparatus. Various general-purpose systems may be used in accordance with the teachings described herein, or it may prove convenient to construct more specialized apparatus to perform methods 300, 400, and 500 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   receiving, by a processing device, a first set of instructions coded in a first language;
   compiling, by the processing device, the first set of instructions to obtain a second set of instructions coded in a second language, wherein the second language is different than the first language;
   executing a compiler extension;
   in response to compiling the first set of instructions, generating, by the compiler extension, a first table of key-value pairs for a first set of error messages that are within the first set of instructions, wherein keys of the key-value pairs in the first table correspond to error messages used with the first set of instructions;
   retrieving, from a memory device, a second table of key-value pairs for default error messages used with the second set of instructions, wherein the second table of key-value pairs is stored at the memory device;
   determining, by the compiler extension, a mistake for a key of the keys of the key-value pairs in the first table by identifying that the key of the key-value pairs in the first table is not in the second table;
   generating a fault message indicating the mistake with the key in the first table; and
   replacing a first key in the first table and in the first set of instructions with a second key in the second table in response to determining that the first key is a variant of the second key in the second table.

2. The method of claim 1, further comprising:
   determining that the key in the first table that is not in the second table is a misspelling of a key in the second table; and
   changing a spelling of the key in the first table and in the set of instructions to match the spelling of the key in the second table.

3. The method of claim 1, wherein the first set of instructions is in a first natural language and the key-value pairs in the second table are from the second set of instructions in a second natural language.

4. The method of claim 1, further comprising:
   determining a type of the mistake as a misspelling error, a grammar error, or a syntax error, wherein the fault message indicates the type of the mistake.

5. The method of claim 1, further comprising:
   determining a mistake with a value by identifying the value of the key-value pairs in the first table that is not in the second table; and
   generating a fault message indicating the mistake with the value.

6. The method of claim 1, wherein a value of the key-value pairs in the first table comprises a unique identifier that identifies a location in an error message in the first set of instructions to insert a numerical value, a string, a word, or a symbol.

7. The method of claim 1, wherein the first set of error messages that are within the first set of instructions are generated by a translation from the first language to the second language and the default error messages are in the first language before the translation.

8. The method of claim 1, wherein the keys in the set of instructions are designated as keys by one or more symbols located before or after the keys.

9. The method of claim 1, wherein the error messages comprise one or more of a failure to set a maximum transmission unit (MTU) on a network, an undeclared identifier error, a common function undeclared error, a parsing error, a file check sequence (FCS) error, a failure to define a network name, a failure to define a network path, or a conflicting internet protocol (IP) address error.

10. An apparatus comprising:
    a memory device; and
    a processing device, operatively coupled with the memory device, to:
    receive a first set of instructions that is coded in a first language;
    compile the first set of instructions to obtain a second set of instructions coded in a second language, wherein the second language is different than the first language;
    execute a compiler extension
    in response to compiling the first set of instructions, generate by the compiler extension, a first table of key-value pairs for a first set of error messages that are within the first set of instructions, wherein keys of the key-value pairs correspond to error messages used with the first set of instructions and values of the key-value pairs represent values to insert into the error messages;
    retrieve, from the memory device, a second table of key-value pairs for default error messages that are used with the second set of instructions, wherein the second key value table is stored at the memory device;

identify a first key of the key-value pairs in first table that is not in the second table;

determine that the first key in the first table is a variant of a second key in the second table; and replace a first key in the first table and in the first set of instructions with a second key in the second table in response to determining that the first key is a variant of the second key in the second table.

11. The apparatus of claim 10, wherein the processing device is to:

determine that the variant of the first key in the first table is a misspelling of the key in the second table; and change a spelling of the first key in the first table and in the set of instructions to match the spelling of the second key in the second table.

12. The apparatus of claim 10, wherein the first set of instructions is for a program written in a first natural language and the key-value pairs in the second table are from the second set of instructions for the program written in a second natural language.

13. The apparatus of claim 12, the first set of error messages that are within the first set of instructions are generated by a translation from the first language to the second language and the default messages are in the first language before the translation.

14. The apparatus of claim 10, wherein the first language is a first programming language and the second language is a second programming language.

15. The apparatus of claim 10, wherein the value of the key-value pairs in the first table comprises one or more symbols in a first error message with a numerical value, a string, or one or more other symbols.

16. The apparatus of claim 10, wherein the processing device is to execute the compiler extension to generate the first table of key-value pairs, retrieve the set of instructions, identify the first key and replace the first key in the first table and in the first set of instructions prior to an execution of the first set of instructions.

17. A non-transitory computer-readable storage medium, having instructions stored therein, which when executed, cause a processing device to:

receive a first set of instructions coded in a first language;

compile the first set of instructions to obtain a second set of instructions coded in a second language, wherein the second language is different than the first language;

execute a compiler extension;

in response to compiling the first set of instructions, generate, by the compiler extension, a first table of key-value pairs for a first set of error messages in the first set of instructions, wherein keys of the key-value pairs correspond to error messages in the first table and values of the key-value pairs represent values to insert into the error messages;

retrieve, from a memory device, a second table of key-value pairs for default error messages used with the second set of instructions wherein the second key value table is stored at the memory device;

determining, by the compiler extension, a mistake for a key of the keys of the key-value pairs in the first table by identifying that the key of the key-value pairs in the first table is not in the second table;

generating a fault message indicating the mistake with the key in the first table;

and replacing a first key in the first table and in the first set of instructions with a second key in the second table in response to determining that the first key is a variant of the second key in the second table.

18. The non-transitory computer-readable storage medium of claim 17, wherein the processing device is to execute the compiler extension to generate the first table of key-value pairs, retrieve the second table of key-value pairs, identify the first value, and remove the first key from the first table prior to an execution of the first set of instructions.

19. The non-transitory computer-readable storage medium of claim 17, wherein the processing device is to:

generate a fault message indicating that the key is not in the second table; and send the fault message to a display device for display.

20. The non-transitory computer-readable storage medium of claim 17, wherein the first language is a first programming language and the second language is a second programming language that is different than the first programming language, and wherein the first table of key-value pairs is for a program written in the first programming language and the second table of key-value pairs is for the program written in the second programming language.

* * * * *